United States Patent Office 3,106,548
Patented Oct. 8, 1963

3,106,548
ETHYLENIC POLYAMIDES
Michel Lavalou, Colombes, France, assignor to Organico, S.A., Paris, France, a corporation of France
No Drawing. Filed June 25, 1958, Ser. No. 744,336
7 Claims. (Cl. 260—78)

This invention relates in general to synthetic polyamide resins and provides a linear polyamide polymer or copolymer having an unsaturated chain which may be cross linked to produce an insoluble infusible polyamide resin. Resins of this type are useful as a molding powder from which shaped articles may be pressed, or which may be extruded as shaped sections, or as a covering on wire. In the lower molecular weight liquid form they are also useful as a varnish.

Polyamide resins known to the art, such as those described in U.S. Patents Nos. 2,071,251; 2,071,253; 2,130,948; 2,252,554; 2,252,555; and 2,252,557 are generally in the form of long organic polymeric chains consisting of hydrocarbon units joined by amide linkages resulting from the condensation of a carboxylic group and an amino group. The utility of resins of this type has been somewhat limited by the fact that they are both soluble and fusible.

Resins of the present invention are produced by the condensation or co-condensation of unsaturated ethylenic amino acids of the type represented by the structure $$\underset{R'}{\overset{R}{\diagdown}}C=\underset{|}{\overset{R''}{C}}-R'''-NH-(CH_2)_n-COOH$$

in which R, R', and R'' represent hydrogen or a monovalent hydrocarbon radical; R''' represents a divalent hydrocarbon radical; and n is a whole number of 5 or more. Amino acids of this type may readily be prepared by the reaction of an ethylenic amine or substituted ethylenic amine:

(A) 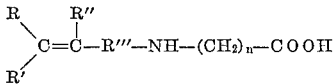

with an ω-halo acid:

(B)         X—(CH$_2$)$_n$—COOH where X represents a halogen atom, according to the general reaction:

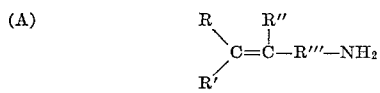
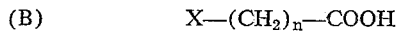
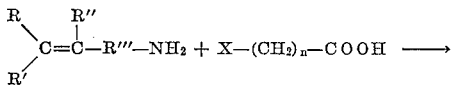

The reaction of the ethylenic amine with the halo acid is exothermic and proceeds upon the combining of the ingredients with the production of hydrogen halide by-product. Preferably an excess of the amine is used and the hydrogen halide combines with that. The amino acid may then be recovered by crystallization in water.

A fusible soluble polyamide condensation resin may be formed by heating the monomeric ethylenic amino acid without a catalyst and in the absence of oxygen. Alternatively, the ethylenic amino acid may be co-condensed with other amino acids or with other compounds or mixtures of compounds condensible to a polyamide. As thus produced these resins in general resemble the synthetic linear polyamide resins known to the art, such as those produced by the condensation of adipic acid and hexamethylene diamine, or by the condensation of amino undecanoic acid.

The resins of invention are however markedly different from the common types of linear polyamides in that the ethylenic groups provide a simple and effective means of cross-linking. When produced in liquid form the resins possess drying properties and may be oxidized by air, particularly in the presence of a drying catalyst, e.g. manganese compounds, used in paints and drying varnishes.

Cross linking of the polyamide resins of this invention may be effected by any of numerous physical or chemical agents commonly used for activating ethylenic groups to cause the ethylenic groups of the resin to join in cross-linking side chains. Cross linking may be effected by prolonged heating of the resin in the absence of air between 200 and 300° C. but an accelerated reaction takes place in the presence of catalysts, such as those commonly used in vinyl polymerizations, e.g. benzoyl peroxide, or in the presence of ionizing radiation, e.g. gamma irradiation or high energy electron radiation. Where it is desired to prevent premature polymerization, inhibitors such as hydroquinone, may be combined with the linear polymer, in a proportion of 0.01 to 0.1% by weight.

By co-condensing the ethylenic amino acid with a saturated amino acid, preferably one of the structure

where m is an integer of 5 or more, in an amount of up to 4 or 5 times the weight of the former, resins capable of a lesser degree of cross linking may be produced. Although cross linked to a lesser extent these resins may contain a sufficient frequency of ethylenic groups to produce cross linking side chains effective to render the resin both insoluble and infusible to a degree dependent upon the relative proportions of ethylenic amino acid to saturated amino acid and on the size of the molecules of the reactant compounds. By varying the nature and the proportion of each of the compounds, it is possible to prepare resins of controllably varied properties such as hardness, elasticity, impact resistance, etc.

The following examples describe in detail a representative and preferred embodiment of this invention:

EXAMPLE I

*Preparation of the Ethylenic Amino Acid:*
*11-N-Allylaminoundecanoic Acid*

11-bromoundecanoic acid which has been purified by crystallization and which melts at 49.5–50° C. is placed in a tight vessel provided with a stirrer and a reflux condenser. Allylamine is then added in the proportion of 4 moles of amine per mole of bromoacid.

The reaction which is highly exothermic starts at room temperature, rises rapidly and becomes stabilized at about 56° C. by reflux distillation of the excess allylamine. After about one hour of stirring, the reaction product sets to a mass which is allowed to stand for several hours, and is then washed out with hot water of about 100° C.

in order to dissolve the amino acid, the excess amine and the allylamine hydrobromide formed during the reaction. Upon cooling the amino acid $$CH_2=CH-CH_2NH-(CH_2)_{10}COOH$$

crystallizes from the water and is filtered off by suction and dried under vacuum at room temperature. The yield of the process is substantially quantitative. The product is white and melts between 95 and 100° C. It may be further purified by crystallization from boiling water; its melting point reaches 105° C. when pure.

EXAMPLE II

*Polycondensation of 11-N-Allylaminoundecanoic Acid Alone*

The product is heated at a temperature between 180 and 240° C. for 2 to 3 hours, first in an atmosphere of pure nitrogen, and then under high vacuum, sufficient to assure the elimination of water. The polycondensate which is formed is a syrupy liquid which is soluble in phenols and in alcohols. It can be used as drying varnish by adding, at the time of use, a conventional manganese drying catalyst which facilitates its insolubilization through spontaneous oxidation by air.

If heating is prolonged for about ten hours at 210°, the solubility of the product decreases considerably, and after 20 hours, the product is an insoluble solid. These periods may be shortened by adding to the mass a catalyst of the type of benzoyl peroxide.

The product which is obtained under these conditions is a brown, elastic gel which swells slightly in very heavy solvents.

EXAMPLE III

*Copolycondensation With 11-Aminoundecanoic Acid*

One part of 11-N-allylaminoundecanoic acid is mixed with five parts of 11-aminoundecanoic acid and the mixture is heated at 210° for 3 hours, first in an atmosphere of pure nitrogen, then later under vacuum as described in Example II. A solid copolycondensation product is obtained which is soluble in phenols and in alcohols.

After grinding, this product may directly serve as molding powder or may be extruded in a conventional extruder in shaped sections or filaments or as a covering on wires.

The pieces which are obtained are rendered insoluble and infusible by an at least 10 hours prolonged heating at about 210°, in the absence of air, but it is preferable to introduce into the polycondensate in powder form a small proportion of an alkyl or aryl peroxide catalyst in order to accelerate this polymerization or else to subject the product which is formed to the action of ionizing radiation, capable of assuring cross linking, such as X-rays, gamma rays, beta rays, or accelerated neutrons.

The resins of this invention are characterized by a linear polyamide molecular chain which includes the structure

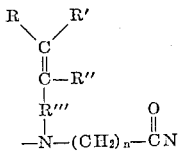

In the examples the 11-N-allylaminoundecanoic acid condenses to the structure

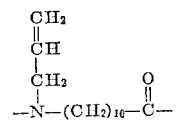

and cross linking occurs through the ethylenic side chains.

Although this invention has been described in detail with specific reference to its preferred embodiment, numerous modifications will readily occur to those skilled in the art and familiar with this disclosure. In particular it is contemplated that other ethylenic amines or substituted ethylene amines, for instance the homologs of allylamine which are known in the art to react in the same manner with an ω halogen, and that other ω halo acids may be substituted for the allylamine and the 11 undecanoic acid set forth in the examples. It is also contemplated that many combinations of the ethylenic amino acid with materials condensible to synthetic linear polyamide resins may be co-condensed in the manner of Example III to produce results well within the skill of workers in the art familiar with this invention. The foregoing disclosure is considered representative of these broader aspects set forth in the opening paragraphs of this specification.

Having thus disclosed my invention and described in detail a preferred and representative embodiment thereof, I claim and desire to secure by Letters Patent:

1. 11-N-allylaminoundecanoic acid.

2. A soluble linear polycarbonamide, at least part of said polyamide consisting of the recurring structural unit

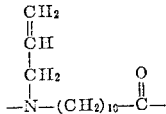

3. A soluble linear polycarbonamide consisting essentially of the recurring structural unit

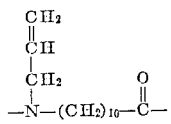

4. The polycarbonamide defined by claim 2 wherein part of the chain consists of the structure

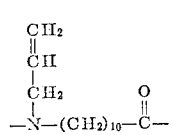

and the remaining part consists of the unit

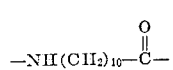

5. A synthetic insoluble infusible cross linked polymer produced by heating the polymer defined by claim 2, whereby the ethylenic groups are activated to form cross links.

6. A synthetic insoluble infusible cross linked polymer produced by subjecting the polymer defined by claim 2 to the addition of a catalyst for vinyl polymerization, whereby the ethylenic groups are activated to form the cross links.

7. A synthetic insoluble infusible cross linked polymer produced by exposing the polymer defined by claim 2 to ionizing radiation, whereby the ethylenic groups are activated to form cross links.

References Cited in the file of this patent

UNITED STATES PATENTS

| | | |
|---|---|---|
| 2,071,253 | Carothers | Feb. 16, 1937 |
| 2,425,283 | Long et al. | Aug. 5, 1947 |